United States Patent

Blackburn

[15] 3,641,546
[45] Feb. 8, 1972

[54] HIGH-LOW VOLTAGE LEVEL SENSOR

[72] Inventor: Richard D. Blackburn, Dalton, Mass.
[73] Assignee: General Electric Company
[22] Filed: Jan. 2, 1970
[21] Appl. No.: 47

[52] U.S. Cl. .........................................340/248 A, 328/148
[51] Int. Cl. .......................................................G08b 21/00
[58] Field of Search ...................................340/149, 248 A; 328/146–149; 307/235

[56] References Cited

UNITED STATES PATENTS 3,534,353  10/1970  Calkin et al...........................340/248 A Primary Examiner—John W. Caldwell
Assistant Examiner—Daniel Myer
Attorney—Francis X. Doyle, Vale P. Myles, Frank L. Neuhauser, Oscar B. Waddell and Joseph B. Forman

[57] ABSTRACT

High- and low-level voltages are derived from a voltage to be monitored and applied, along with a reference voltage, to the input terminals of a pair of comparators. An over voltage condition causes the comparator monitoring the low-level voltage to be energized, while an under voltage condition results in the energization of the comparator monitoring the higher level voltage. The signal then produced by the comparators is used to energize an alarm device.

6 Claims, 5 Drawing Figures

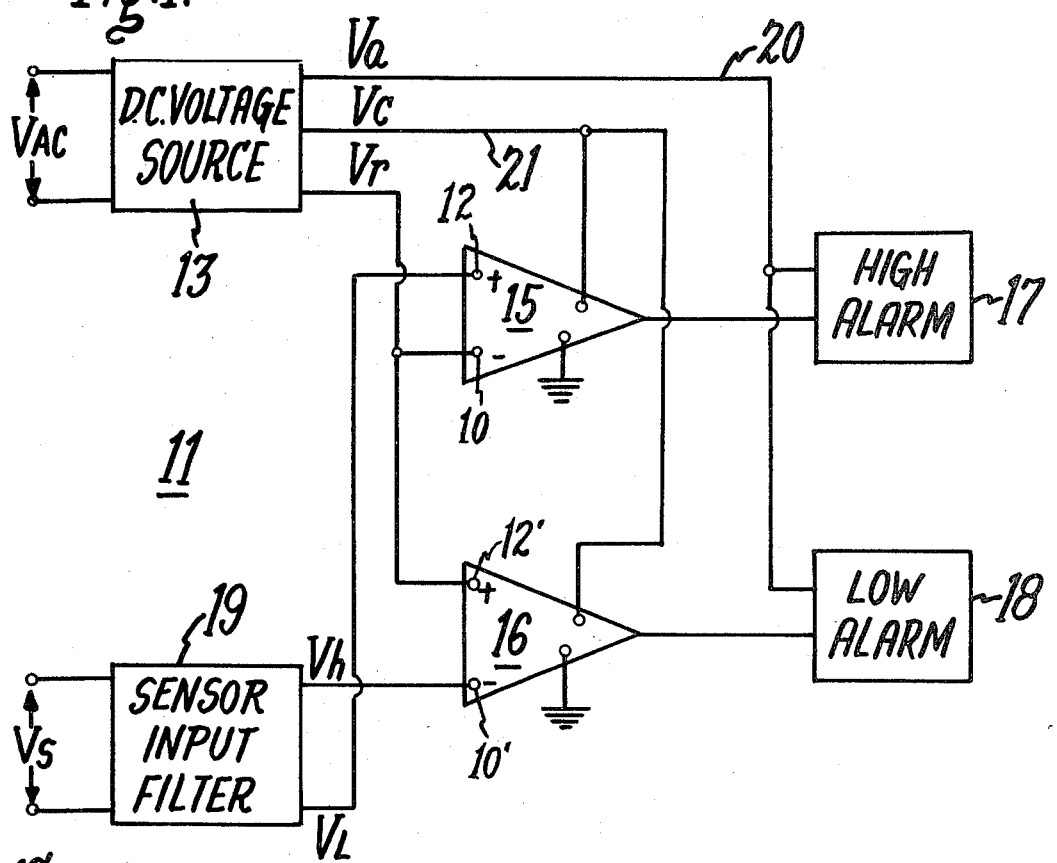
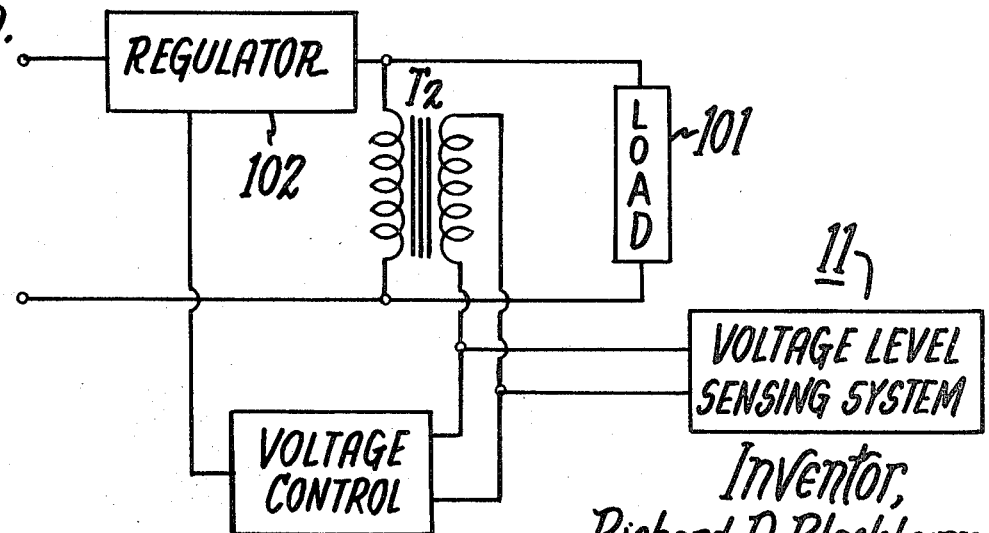

Inventor,
Richard D. Blackburn,
by Francis K. Doyle
His Attorney.

Inventor,
Richard D. Blackburn,
by Francis K. Doyle
His Attorney.

HIGH-LOW VOLTAGE LEVEL SENSOR

BACKGROUND OF THE INVENTION

The subject invention relates to voltage level sensors and, more particularly, to voltage-responsive alarm systems utilizing semiconductor devices for distinguishing over or under voltage conditions.

The apparatus of this invention is capable of monitoring the level of a voltage which is subject to either small or extreme fluctuations, and maintains its accuracy over a broad range of ambient temperatures. The simplicity and economy of the device makes it particularly adaptable to those instances where a backup or "fail-safe" system is desired to supplement a more elaborate detection and regulation system. Prior art devices utilized for monitoring functions have often relied upon cumbersome and expensive electromechanical devices such as meter movements, relay contacts, or magnetic switches to energize an alarm circuit in response to undesired excursions of a monitored voltage. Many of these devices were subject to the further deficiency that they derived their power solely from the source being monitored.

The sensitivity of such arrangements often left much to be desired in providing highly responsive, rapidly actuated voltage detection systems. In recent years, some attempts have been made to produce voltage monitoring devices utilizing transistors in order to attain the desired sensitivity and response. However, most of the devices have been relatively complex and expensive, and have suffered from the disadvantage of instability in the presence of broad temperature variations. Still further, the low signal level required to operate most transistorized detection systems have prevented the application of such systems where a wide range of voltage excursions is to be accommodated.

SUMMARY OF THE INVENTION

The present invention derives reference and supply voltages from a suitable source of DC power, which may be the rectified output of a step down transformer drawing its power from a commercial AC power source. The reference voltage is regulated by temperature compensated Zener diode to provide voltage stability under varying ambient temperatures. An AC voltage to be monitored is rectified and applied across a voltage divider having two taps thereon. The tap providing the higher voltage is coupled to "invert" input terminal of a voltage comparator, whose "noninvert" input terminal is coupled to the aforementioned source of reference voltage. The lower voltage derived from the voltage divider is applied to the "-noninvert" input terminal of a second comparator, the "invert" terminal of said second comparator being coupled to the source of reference voltage.

The comparators utilized are of the type which produces no output signal so long as the voltage of the "invert" terminal is greater than or equal to that at the noninvert." When, however, the voltage of the "noninvert" terminal exceeds that of the "invert" terminal the comparator is energized, and produces a voltage of a predetermined magnitude at is output terminal. The heart of the comparator utilized in the preferred embodiment of the invention is a high gain, integrated circuit operational amplifier. Integrated circuitry, while not essential, is preferable to insure that all elements of the amplifier remain at the same temperature. This insures the predictable operation of the amplifier under varying ambient temperatures. A feedback loop resistively coupling the amplifier output terminal to the "noninvert" input terminal provides the regenerative feedback necessary to drive the amplifier into saturation, and thus lock its output "on" until such time as the "noninvert" terminal voltage drops below that of the "invert" terminal. The output signal of the comparator is used to gate a further amplifying device such as a transistor, which energizes an alarm system.

It is therefore an object of the present invention to provide a voltage sensor device utilizing solid-state elements which remains stable under fluctuating temperatures.

It is a further object of the present invention to provide a solid-state voltage sensing circuit which will accommodate a wide range of voltage excursions.

It is a still further object of the present invention to provide a simple, economical solid-state voltage monitoring system which is energized by a power supply other than that monitored.

BRIEF DESCRIPTION OF THE DRAWINGS

While the specification concludes with claims particularly pointing out and distinctly claiming the subject matter which is regarded as the invention, it is believed that the invention will be better understood from the following description of the present preferred embodiment take in connection with the accompanying drawings in which:

FIG. 1 is a diagrammatic view of a preferred embodiment of the basic elements comprising the subject invention;

FIG. 5 is a diagram showing the present invention used in conjunction with a typical voltage regulation system.

DESCRIPTION OF THE PREFERRED EMBODIMENT

Figure 2:
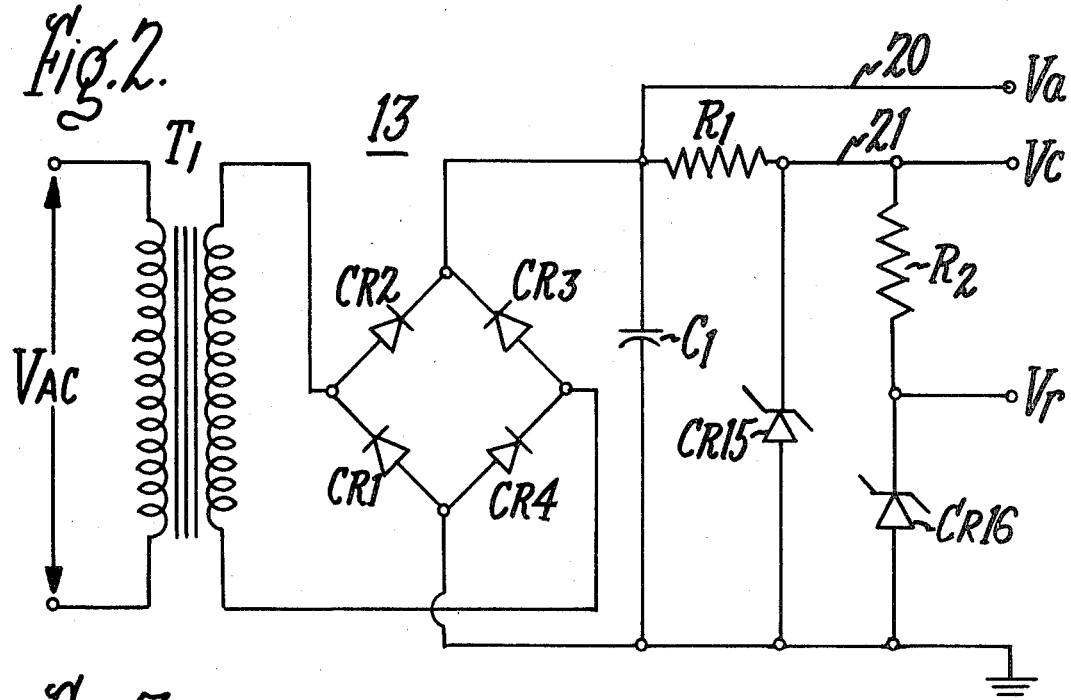
FIG. 2 is a detailed schematic diagram of a preferred circuit for providing a reference voltage and supply power for use in the present invention.

Referring now to FIG. 1, the preferred form of voltage level sensing system 11 is shown in which a voltage supply 13 is provided which supplies a DC voltage $V_c$ to energize comparators 15 and 16, and a DC voltage $V_a$ to alarm devices 17 and 18. The voltage supply also provides a reference voltage $V_r$ to "-noninvert" and "invert" input terminals 12' and 10, of comparators 16 and 15, respectively. A sensor input filter 19 converts monitored AC voltage $V_s$ into DC, and provides two outputs of differing voltage level $V_L$ and $V_h$. The lower voltage $V_L$ is coupled to "noninvert" terminal 12 of comparator 15, while the higher voltage $V_h$ is coupled to "invert" terminal 10' of comparator 16. The voltages $V_h$ and $V_L$ produced by sensor input filter 19 bear a fixed relationship to the level of $V_s$. They thus undergo changes in value which are proportional to changes which occur in the value of $V_s$.

Under normal operating conditions, $V_L$ is of a value somewhat lower than $V_r$, and $V_h$ is somewhat higher than $V_r$. It will be seen that, for a normal level of $V_s$, comparators 15 and 16 experience voltage levels at their "noninvert" terminals 12 and 12' which are less than those at their "invert" terminals 10, 10'.

As $V_s$ increases, both $V_L$ and $V_h$ will increase proportionally. Since $V_h$ already exceeds $V_r$, comparator 16 will remain deenergized. However, when $V_L$ exceeds $V_r$ comparator 15 experiences a "noninvert" terminal voltage which is greater than the "invert" terminal voltage. Comparator 15 is thus energized and produces a positive voltage at its output terminal 7, actuating alarm 17.

As will now be understood, as $V_s$ decreases, $V_L$ and $V_h$ decline proportionally. Comparator 15 will now remain deenergized since $V_L$ is less than $V_r$. Comparator 16, however, now experiences an "invert" terminal voltage $V_h$ which is less than "noninvert" terminal voltage $V_r$ and is energized to produce a positive voltage at its output terminal 7, actuating alarm 18.

FIG. 2 reveals a preferred embodiment of the DC supply 13 shown in FIG. 1. An AC supply voltage $V_{ac}$ which may advantageously be taken from any commercially available source, is supplied to the primary winding of transformer $T_1$. A bridge-type rectifier composed of diodes CR 1, CR 2, CR 3, and CR 4 is connected across the secondary winding of the transformer $T_1$. The full wave rectified output of the bridge $V_a$ is supplied to alarm devices 17 and 18 by means of conductor 20. After being filtered and regulated by resistor $R_1$, capacitor $C_1$, and Zener diode CR 15, the resulting voltage $V_c$ is supplied to comparators 15 and 16 by means of conductor 21. A voltage divider comprising resistor $R_2$ and temperature stabilized Zener diode CR 16 is placed across Zener CR 15 and the voltage $V_r$ occurring at the intersection of resistor $R_2$ and Zener diode CR 16, which preferably has a magnitude of approximately 6 volts, is supplied to "invert" terminal 10 of comparator 15 and "noninvert" terminal 12' of comparator 16.

Figure 3:
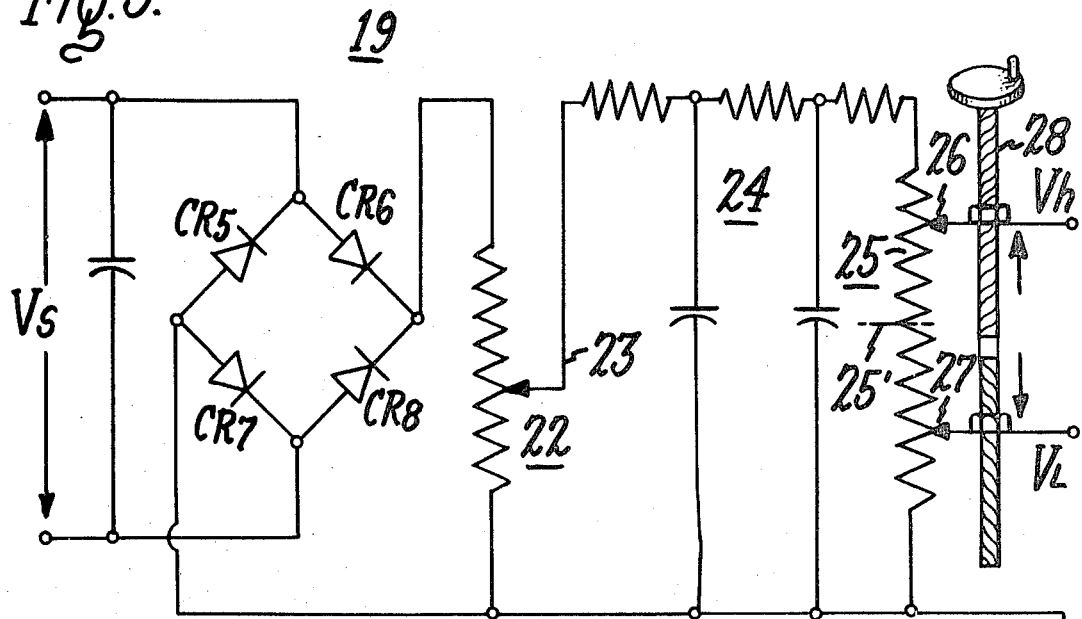
FIG. 3 is a schematic diagram of a preferred circuit used to derive suitable DC output voltages from a monitored AC voltage for application to a pair of comparators.

The sensor input filter 19 as shown in FIG. 3 consists essentially of a bridge-type rectifier comprised of diodes CR 5, CR 6, CR 7, and CR 8 with potentiometer 22 connected across the output terminal thereof. The adjustable tap 23 of the potentiometer acts as a coarse adjustment to select the voltage level to be applied to RC filter network 24 and thence to a final, double tap voltage divider 25 having thereon adjustable taps 26 and 27 to provide voltages $V_h$ and $V_l$. Taps 26 and 27 may be individually adjustable, but preferably are linked together as by a double-threaded lead screw 28 so as to simultaneously approach, or recede from, a common point 25' on the resistive divider 25. By so doing, the "bandwidth," or voltage difference, between taps 26 and 27 may be varied while leaving the median voltage unchanged.

Figure 4:
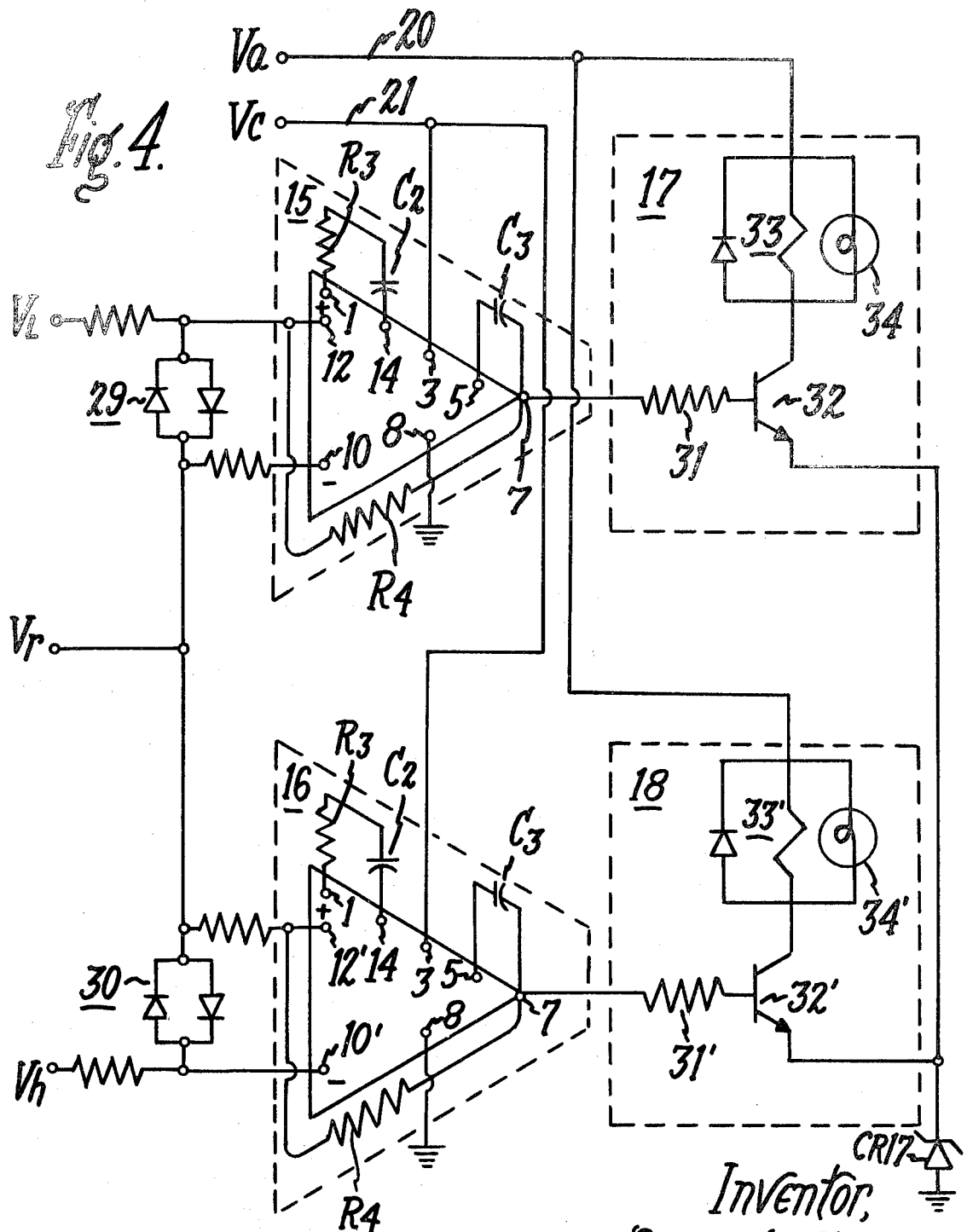
FIG. 4 is a schematic diagram of the preferred embodiment of comparators and associated alarm circuits.

Referring now to FIG. 4, it will be seen that voltage $V_L$, derived from tap 27 of sensor input filter 19 is resistively coupled to "noninvert" input terminal 12 of comparator 15, while voltage $V_h$, from tap 26 is resistively coupled to "invert" terminal 10' of comparator 16. Input terminals 10 and 12' of comparators 15 and 16, respectively, are both coupled to a common reference voltage $V_r$ provided by DC supply 13. Pairs of diodes connected in inverse parallel relation, indicated at 29 and 30, may be coupled across the input terminals of comparators 15 and 16 in order to limit the voltages thereacross. While the inverse parallel diodes will sustain sufficient voltage thereacross to allow the operation of comparators 15 and 16, undesirably high voltages, such as may be caused by transient fluctuations of the voltage supplies, will be shunted thereby for protecting the comparators.

In the preferred embodiment illustrated in FIG. 4, the comparators comprise General Electric Company PA238 integrated circuit operational amplifiers, connected as shown. In order to more clearly teach the disclosed embodiment, the numbering system used by the manufacturer for the amplifier terminals has been retained. The series connection of resistor $R_3$ and capacitor $C_2$ between amplifier terminal 1 and 14 prevents chatter or oscillation, as does capacitor $C_3$ which is series connected between the comparator output 7 and terminal 5. In addition, regenerative feedback is provided by means of resistor $R_4$ connected between the comparator output 7 and the "noninvert" input terminal 12. The outputs of comparators 15 and 16 are coupled by resistors 31 and 31' to the bases of NPN-transistors 32 and 32' each of which is connected in series with an alarm system and Zener diode CR 17. For purposes of illustration the alarms shown comprise a diode shunted relay winding 33 and an incandescent light bulb 34.

In operation, supply voltage $V_a$ is provided to alarms 17 and 18 by conductor 20 and supply voltage $V_c$ to terminal 3 of each of comparators 15 and 16 by conductor 21. In addition, a predetermined reference voltage $V_r$ is supplied to the "invert" terminal 10 of comparator 15 and the "noninvert" terminal 12' of comparator 16. Operation of the comparators is such that when the value of the voltage applied to the "noninvert" input exceeds that at the "invert" input, the comparator is energized and produces an output voltage. The regenerative feedback loop comprising resistor $R_4$ then applied this output to the "noninvert" terminal in a manner well known to those skilled in the art in order to drive the comparator output voltage to its maximum level. It will be noted that the reference voltage $V_r$ from DC power supply 13 supplied the "invert" terminal voltage in the case of comparator 15, and the "noninvert" terminal voltage for comparator 16.

In order to energize comparator 15, low voltage $V_L$ must exceed $V_r$ or, conversely, to energize comparator 16 the higher voltage $V_h$ must fall below the $V_r$. Since the voltage $V_h$ provided at tap 26 of the sensor input filter exceeds $V_L$ at tap 27 by some predetermined amount, it is possible to adjust the output voltage divider 25 of the sensor input filter 19 to limit, in either direction, the excursion which the voltage provided by the filter may undergo before triggering a comparator.

It will be seen that by varying the location of the tap 23 in the first voltage divider 22 of the sensor input filter 19, the median value of the voltage band provided at the output voltage divider may be changed. Lower voltage $V_L$ and higher voltage $V_h$ may thus be caused to differ from reference voltage $V_r$ by unequal amounts and thus cause the alarm system to be triggered by smaller excursions in one direction than the other.

The output signal provided by the comparators 15, 16 is normally insufficient to operate signaling devices of the type normally desired. For this reason, comparator outputs are coupled through resistors 31, 31' to the bases of NPN-transistors 32, 32' which act to gate current through the desired signalling devices 33, 34, of alarm 17 or 33', 34' of alarm 18. Isolation for transistors 32 and 32' is provided by Zener diode CR 17 which prevents the transistors from being biased to the "on" mode due to fluctuations or drift in the ambient level of the comparator output voltage.

FIG. 5 discloses one application of the instant invention in conjunction with a typical voltage regulation system. Unregulated AC is supplied to a load 101 through a regulator 102. Transformer T2 provides voltage control 103 with a signal which reflects the voltage applied to load 101. As will be understood by those skilled in the art, voltage control 103 typically includes over and under voltage sensing equipment, time delay circuitry, and line drop compensation circuitry. The present invention, generally indicated at 11, is connected to monitor the signal $V_s$ produced by transformer T2. By setting the bandwidth of the over and under voltage sensing device 11 to a bandwidth somewhat greater than that allowed by the voltage control system 103, an alarm will only be energized when the standard voltage control apparatus fails to regulate line voltage within some predetermined limits. By drawing the power to energize the inventive circuit from a separate power source, the system of the present invention will remain operative even should the main power source being monitored fail completely. Further, by providing a temperature compensated reference voltage source and integrated amplifier circuitry the system response is rendered relatively insensitive to changes in ambient temperature, admirably suiting the system for outdoor installations.

It will thus be seen that the invention provides a voltage-monitoring circuit suitable either as a primary or a backup voltage monitoring system. Still further, the inventive system is not subject to disablement by the failure of a main power system being monitored, or to a loss in accuracy due to a fluctuation in ambient temperature.

As will be evident from the foregoing description, certain aspects of the invention are not limited to the particular details of construction of the examples illustrated, and it is therefore contemplated that other modifications or applications will occur to those skilled in the art. It is, therefore, intended that the appended claims shall cover such modifications and applications as do no depart from the true spirit and scope of the invention.

What is claimed as new and is desired to secure by Letters Patent of the United States is:

1. A voltage sensor, comprising:
   a. a first source of reference voltage;
   b. a second source of voltage whose magnitude is a function of the value of a voltage to be monitored;
   c. impedance means coupled to the output output signal when the voltage at a first input terminal exceeds voltage source and having two output terminals for providing a higher and a lower voltage;

d. first comparator means for providing an output terminal exceeds that of a second input terminal, said first input terminal being coupled to the lower voltage output of said impedance means and said second input terminal being coupled to said source of reference voltage;

e. second comparator means for providing an output signal when the voltage at a first input terminal exceeds that of a second input terminal, said second input terminal being coupled to the higher voltage output of said impedance means and said first input terminal being coupled to said source of reference voltage; and f. alarm means coupled to the outputs of said comparators, said alarm means being energized by an output signal from said first or said second comparator.

2. The voltage sensor as defined in claim 1, wherein a said reference voltage is derived from a temperature compensated Zener diode.

3. The voltage sensor defined in claim 1, wherein said comparator means include amplifier comprising integrated circuits, said comparator means further including a resistive path for providing regenerative feedback from an output terminal to an input terminal of said amplifier.

4. The voltage sensor defined in claim 1 wherein a Zener diode is serially connected between said alarm means and ground.

5. The voltage sensor as defined in claim 1 wherein the two output terminals of the impedance means coupled to the output of said second voltage source are mechanically coupled so as to provide an adjustable voltage differential therebetween.

6. In combination:

a voltage regulator having an input for sensing line voltage and an output for regulating said voltage in response to said sensed input;

a voltage source comprising impedance means to be coupled to said sensed voltage and having two output terminals for providing two different voltages therefrom;

first comparator means for providing a signal when the voltage at a first terminal exceeds that at a second terminal, said first terminal being coupled to the lower voltage output of said impedance means and said second terminal being coupled to a source of reference voltage;

second comparator means for providing a signal when the voltage at a first terminal exceeds that at a second input terminal, said second input terminal being coupled to the higher voltage output of said impedance means and said first input terminal being coupled to said source of reference voltage; and alarm means operatively coupled to the outputs of said comparators.

* * * * *

UNITED STATES PATENT OFFICE
CERTIFICATE OF CORRECTION

Patent No. 3,641,546                    Dated February 8, 1972

Inventor(s) Richard D. Blackburn

It is certified that error appears in the above-identified patent and that said Letters Patent are hereby corrected as shown below:

| | |
|---|---|
| Col. 1, line 58 | "is" should be - its - |
| Col. 3, line 18 | "$V_1$" should be - $V_L$ - |
| Col. 4, line 65 | "no" should be - not - |
| Col. 4, lines 73 and 74 | Delete "output signal when the voltage at a first input terminal exceeds voltage" and insert - of said second voltage - |
| Col. 5, line 1 | after "output" insert - signal when the voltage at a first input - |

Signed and sealed this 11th day of July 1972.

(SEAL)
Attest:

EDWARD M. FLETCHER, JR.
Attesting Officer

ROBERT GOTTSCHALK
Commissioner of Patents